J. LANE.
Cast Steel Plates for Edge Tools.

No. 230,948.　　　　　　Patented Aug. 10, 1880.

Witnesses.
Isaac Josephi.
Louis Hennings

Inventor.
John Lane

UNITED STATES PATENT OFFICE.

JOHN LANE, OF HYDE PARK, ILLINOIS.

CAST-STEEL PLATE FOR EDGE-TOOLS.

SPECIFICATION forming part of Letters Patent No. 230,948, dated August 10, 1880.

Application filed November 29, 1879.

*To all whom it may concern:*

Be it known that I, JOHN LANE, of Hyde Park, in the county of Cook and State of Illinois, have invented a new and useful Improvement in the Manufacture of Cast-Steel Plates or Bars for cutting implements which have their cutting-edge formed and made from the middle part of the plate or bar; and I do hereby declare the following to be a full, clear, and exact description of the same.

My invention relates to plates or bars of cast-steel for cutting implements, as plowshares, colter-blades, cultivator-teeth, hay-knives, scythes, cornstalk-cutters, millstone-picks, knife-blades, and other cutting implements which have their cutting-edge formed and made from the middle part of the plate or bar of steel.

Heretofore such cutting implements required to be hardened and tempered after being formed from the plate or bar, to fit them with suitable hard-tempered cutting-edges, which by my invention is avoided.

The object of my invention contemplates producing plates or bars of cast-steel which shall have a middle section sufficiently hard-tempered not to require further hardening and tempering, and from which knife-blades and other cutting implements may be formed and made without any necessity of hardening and tempering them to fit them with good cutting-edges, and having exteriors of less hard-tempered cast-steel for supporting the hard-tempered middle section from liability to break, and also for producing a self-sharpening cutting implement by the exteriors being the softer and wearing away the faster, keeping the thin middle section sharp-cutting by wear in use, and also for producing a superior polish.

My invention consists in interposing a middle-section layer of hard-tempered cast-steel between exterior-section layers of less-hard tempered cast-steel, as hereinafter more fully set forth.

It is well known tempered cast-steel may be made of any desired degree of hardness by the introducing of more or less carbon in the making of the steel—the more carbon in the steel the harder tempered it will be. I take advantage of this fact in the making of my improved plate or bar of cast-steel by adding an extra quantity of carbon to the middle-section strata part of the plate or bar, producing a hard-tempered cast-steel, which will not need hardening further when being made into cutting implements to equal ordinary cast-steel hardened and tempered.

Figure 1:
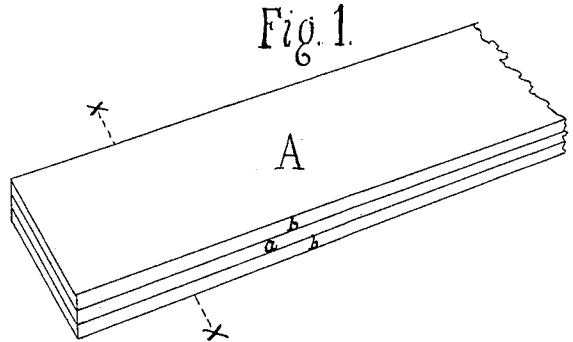
Figure 2:
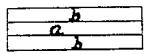

Referring to the annexed drawings, Figure 1 gives a view of my improved plate or bar A of cast-steel, and Fig. 2 a cross-section view of same on line $x\ x$ of Fig. 1.

The plate or bar A is formed of three layers of cast-steel, making what I call "three-ply hard-center cast-steel," the middle part, $a$, being hard-tempered cast-steel by the combining therewith of an extra quantity of carbon, and the exterior parts, $b\ b$, at each side of same are of less-hard tempered cast-steel without the extra quantity of carbon combined therewith.

I prefer a process of making my improved plate or bar of cast-steel as follows: I first prepare a block of hard-tempered cast-steel, which has been made by introducing and combining therewith an extra quantity of carbon, which block, properly prepared, I place in the center of an ingot-mold, when molten cast-steel is then turned in on each side of said block, and uniting therewith in the process of casting, forming an ingot of cast-steel having a hard-tempered middle-section part. The ingot is afterward rolled to desired thickness for plates or bars, from which cutting implements are formed and made in the usual process of making such, without any need of hardening or tempering in the making of the implement.

In operation, cutting implements formed and made from my improved plate or bar of cast-steel will have avoided all necessity of the process of hardening and tempering in their making, and the exteriors being cast-steel instead of iron a better polish, more elasticity, and less weight are secured.

The process of casting molten cast-steel on both sides of a central plate or block in an ingot-mold is not new, and I make no claim to such process, broadly; and I am aware it is not new to make compound blocks or masses of steel of varying temper and hardness by first running the same in a molten condition successively into molds, and by then stamping or rolling the same, and such I do not claim, broadly.

Having thus fully set forth my invention, I claim—

The plate or bar of cast-steel suitable for cutting implements which have their cutting-edge formed from the center of the bar or plate, consisting of strata of cast-steel, the middle-section part being hard-tempered and the exterior-section parts being less-hard tempered, substantially as and for the purpose set forth.

JOHN LANE.

Witnesses:
 FRANK M. WILSON,
 E. L. LANE.